UNITED STATES PATENT OFFICE.

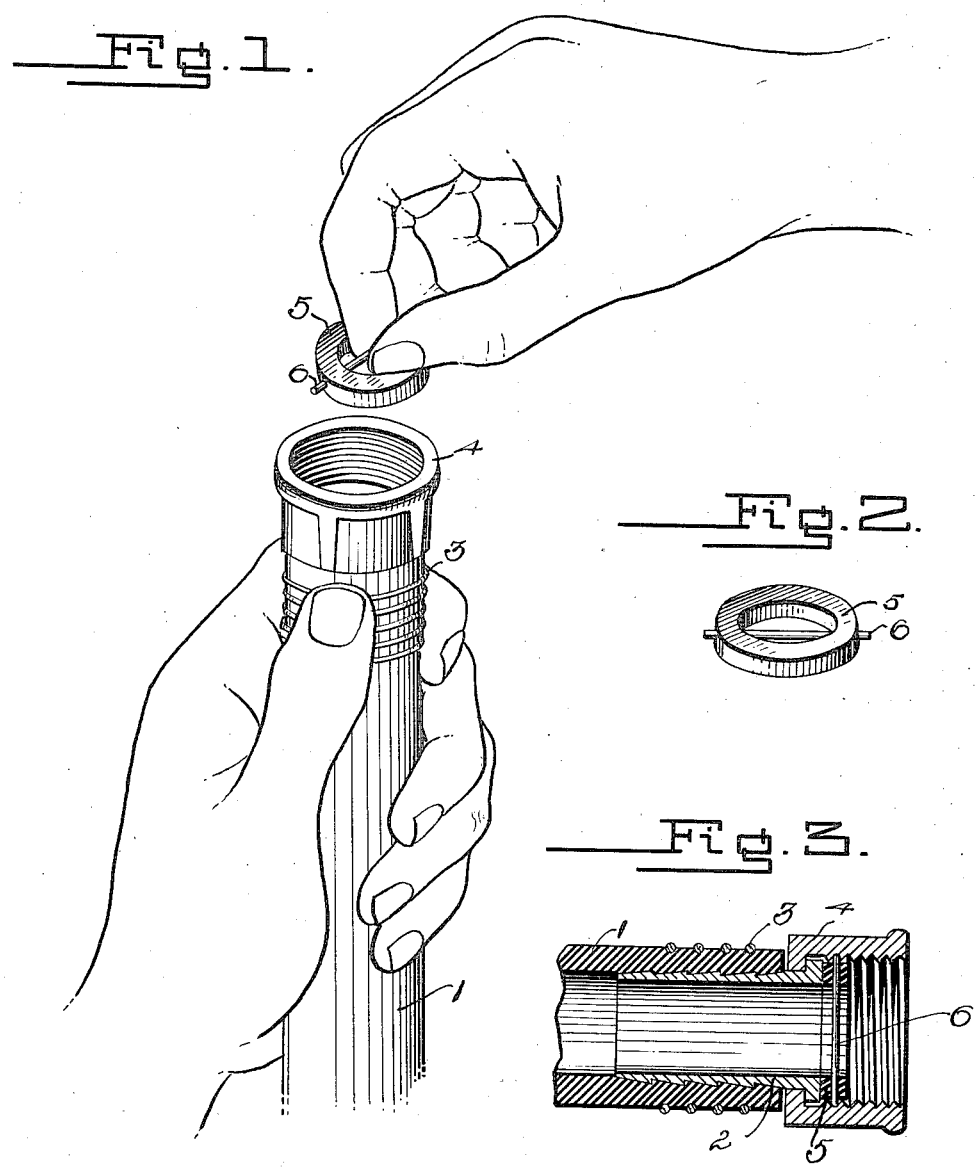

ARDEN WHIPPLE, OF OAKLAND, CALIFORNIA, ASSIGNOR OF FORTY-NINE ONE-HUNDREDTHS TO CHARLES L. BLODGETT, OF OAKLAND, CALIFORNIA.

HOSE-COUPLING WASHER.

1,019,572.      Specification of Letters Patent.      Patented Mar. 5, 1912.

Application filed August 15, 1910, Serial No. 577,186. Renewed October 28, 1911. Serial No. 657,337.

*To all whom it may concern:*

Be it known that I, ARDEN WHIPPLE, a citizen of the United States, residing at Oakland, in the county of Alameda and State of California, have invented certain new and useful Improvements in Hose-Coupling Washers, of which the following is a specification.

This invention relates to hose couplings and the main object of the same is to produce a means which will hold the washer within the socket and prevent the same from coming out and being lost. It very often happens that when drawing the hose across the lawn either before or after using the same that the washer drops out and gets lost. This invention is to prevent this from happening.

Referring to the accompanying drawings:—Figure 1 is a perspective view showing the washer about to be applied to the hose coupling. Fig. 2 is a perspective view of the washer and showing the bar which keeps the washer in place. Fig. 3 is a longitudinal sectional view through the end of a hose and coupling and showing how the washer is retained in place.

Referring to the drawings by numerals, 1 indicates a portion of the hose in the end of which the shank 2 of the coupling is inserted and is secured into place by means of the wire binding 3. The threaded socket piece 4 is loosely mounted upon the outer end of the shank 2. This portion is the same as ordinarily used in a garden hose.

The washer 5 is of the ordinary construction and is preferably formed of rubber. A wire bar 6 is inserted through openings in the washer and extends across the central opening as clearly shown in Fig. 2. By means of having the bar extend across the central opening the washer can be easily held while being inserted within the socket piece as shown in Fig. 1. After the washer has been inserted within the socket piece the thumb is placed against the central portion of the bar 6 and the washer is pushed to the bottom of the socket. As the bar is made of flexible wire it can easily ride over the threads of the socket piece, but after it has reached the bottom of the socket and the thumb removed the wire straightens again and fits into the threads as clearly shown in Fig. 3. By this means the washer is securely held in place and cannot come out. When it is desired to remove the washer the finger can be inserted into the socket piece and around the bar. The washer may then be easily withdrawn.

If desired the bar 6 can be made of a strip of rigid wire and when this is used the washer is inserted into the socket by placing the ends which extend to either side of the washer into the threads and then turn the washer into place.

Having thus described my invention what I claim is:—

1. A resilient gasket comprising a body portion provided with alined openings, and a straight bar of metal passing through said openings and extending to each side of said body portion.

2. A gasket comprising a body portion provided with alined openings, and a straight bar of resilient metal passing through said openings and extending beyond the outer edges of said body portion.

3. A resilient gasket comprising a body portion having a central open space and also provided with diametrically disposed alined openings, and a straight bar of resilient metal extending through said openings and projecting beyond the outer edges of said body portion, the intermediate portion of said bar serving as a finger hold, and the ends of said bar adapted to engage the threads of a socket piece to hold said gasket in place.

In testimony whereof I affix my signature in presence of two witnesses.

ARDEN WHIPPLE.

Witnesses:
    HOMER APRAHAMIAN,
    F. P. SCHROEDER.